United States Patent [19]
Arai

[11] Patent Number: 5,969,060
[45] Date of Patent: Oct. 19, 1999

[54] EPOXY RESIN COMPOSITION AND METHOD FOR PRODUCING THE SAME

[75] Inventor: Noriyuki Arai, Tokyo, Japan

[73] Assignee: Sumitomo Chemical Company, Limited, Osaka, Japan

[21] Appl. No.: 09/050,395

[22] Filed: Mar. 31, 1998

[30] Foreign Application Priority Data

Mar. 31, 1997 [JP] Japan .................................. 9-080100

[51] Int. Cl.$^6$ ................................................. C08F 283/00
[52] U.S. Cl. ............................................................. 525/524
[58] Field of Search ............................................. 525/524

[56] References Cited

U.S. PATENT DOCUMENTS 5,206,313  4/1993  Ono et al. ............................... 525/524

FOREIGN PATENT DOCUMENTS

| 0724006A1 | 7/1996  | European Pat. Off. |
| 02300255  | 12/1990 | Japan . |
| 07179564  | 7/1995  | Japan . |
| 7-196952  | 8/1995  | Japan . |

*Primary Examiner*—Randy Gulakowski
*Attorney, Agent, or Firm*—Pillsbury Madison & Sutro LLP

[57] ABSTRACT

Provided is an epoxy resin composition comprising a crystalline epoxy resin (A) and an amorphous epoxy resin as an essential component, wherein the crystalline epoxy resin (A) being uniformly dispersed in the amorphous epoxy resin (B) as a crystallite. The epoxy resin composition has a high softening point, hardly causes blocking during the storage and has an excellent handling property.

2 Claims, No Drawings

EPOXY RESIN COMPOSITION AND METHOD FOR PRODUCING THE SAME

BACKGROUND OF THE INVENTION

1. Field of the Invention

The present invention relates to an epoxy resin composition, which is superior in workability and useful for adhesives, paints, insulation materials and electrical/electronic materials (e.g. laminated plate, etc.), particularly useful for encapsulating electronic devices.

2. Description of the Related Art

For encapsulation of semiconductors such as LSI, IC, transistor, etc., economically useful transfer molding of an epoxy resin composition has recently been carried out. In this case, a softening point of the resin composition is important in view of handling. The resin composition having a low softening point sometimes causes blocking during the storage to result in deterioration of the workability. Therefore, the composition is stored generally with cooling in a refrigerator, but there has been a problem that the productive efficiency is poor.

SUMMARY OF THE INVENTION

An object of the present invention is to provide an epoxy resin composition, which has a high softening point and hardly causes blocking during the storage.

That is, the present invention is as follows:

1 an epoxy resin composition comprising a crystalline epoxy resin (A) and an amorphous epoxy resin as an essential component, wherein the crystalline epoxy resin (A) is uniformly dispersed in the amorphous epoxy resin (B) as a crystallite;

2 a method for producing the epoxy resin composition of (1), which comprises mixing a crystalline epoxy resin (A) with an amorphous epoxy resin (B) with heating at a temperature of not higher than a melting point of the former and not lower than a softening point of the latter.

3 a method for producing the epoxy resin composition of (1), which comprises mixing a crystalline epoxy resin (A) with an amorphous epoxy resin (B) with heating at a temperature of not lower than a melting point of the former and not lower than that of the latter, cooling the resulting mixture to a temperature of not higher than the melting point of the former to deposit a crystal of the former and then kneading the mixture.

DETAILED DESCRIPTION OF THE INVENTION

The present invention provides a resin composition having a high softening point by uniformly dispersing an crystalline epoxy resin in an amorphous epoxy resin in the form of a crystallite.

In the composition, all or a part of the crystalline epoxy resin should be dispersed uniformly in the amorphous epoxy resin. Uniform dispersion of the crystallite is preferable, but it is not restricted as long as the softening point of the composition is higher than the temperature which causes blocking during the storage and the performance does not vary with the position unfavorably.

Furthermore, the particle size of the crystallite is preferably not larger than 100 μm, and more preferably not larger than 50 μm. When the particle size is larger than the above range, the performance varies with the position and melting properties of the crystallite are lowered during the molding/curing to cause a defective molding.

The method of producing the epoxy resin composition of the present invention is not particularly limited if all or a part of the crystalline epoxy resin can be dispersed in the amorphous epoxy resin in the form of a crystallite, and examples thereof include a method of melt-mixing and a method of mixing using a solvent. Between them, the former is preferred in view of the practical use. Hereinafter, the former method will be described in detail.

The composition and the mixing temperature are important to obtain the epoxy resin composition of the present invention by melt-mixing.

Regarding the composition, the amount of the crystalline epoxy resin is preferably more than 5% by weight based on the total amount, more preferably more than 10% by weight, and most preferably more than 30% by weight.

When the amount is 5% by weight or less, the effect of decreasing the viscosity of whole resin composition becomes low and it is difficult to uniformly disperse the crystalline epoxy resin in the amorphous epoxy resin as a crystallite, and the softening point of the composition may be lowered.

The upper limit of the amount of the crystalline epoxy resin is not restricted, but it is preferably not more than 80% by weight based on the total amount.

Regarding the mixing temperature, there is exemplified a method of melt-mixing with heating at a temperature of not lower than the softening point of the amorphous epoxy resin and not higher than the melting point of the crystalline epoxy resin. This temperature is preferably 10–30° C. lower than the melting point of the crystalline epoxy resin. When the mixing temperature is higher than the melting point of the crystalline epoxy resin, the proportion of the crystalline epoxy resin existing in the amorphous epoxy resin as a crystallite is lowered unfavorably. When the mixing temperature is lower than the softening point of the amorphous epoxy resin, numerous energy is required for kneading and it is industrially disadvantageous.

On the other hand, a resin composition having an uniform phase structure wherein both amorphous epoxy resin and crystalline epoxy resin are compatiblized each other is prepared by melt-mixing at a temperature higher than the melting point of crystalline epoxy resin, then the resin composition is cooled to a temperature not higher than the melting point of the crystalline epoxy resin to deposit a crystallite, and the resin composition is further kneaded at a temperature of not lower than the softening point of the amorphous epoxy resin and not higher than the melting point of the crystalline epoxy resin to uniformly disperse a crystallite of the crystalline epoxy resin in the amorphous epoxy resin. The kneading temperature in this case is preferably 20–30° C. lower than the melting point.

In these production methods, a mixer, a twin roll, an extruder, etc. are used.

The dispersion state of the crystallite in the resin composition of the present invention can be confirmed by using a polarized light microscope.

The crystalline epoxy resin as the component (A) used in the present invention may be any epoxy resins having crystallizability, but is not particularly limited. Examples thereof include those having a mesogen skeleton or a bisphenol skeleton and low molecular weight, etc. Specific examples of those having a mesogen skeleton include an epoxy resin represented by the following general formula (1).

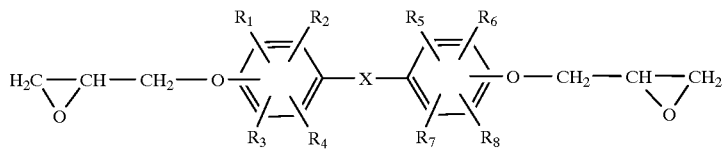

wherein X represents a single bond or a group selected from —N=N—, —CH=CH—, —O—CO—, —CH=C(CH₃)—, —CH=C(CN)—, —C≡C— and —CH=CH—CO—; and $R_1$ to $R_6$ independently represent an acyclic or cyclic alkyl group having 1 to 6 carbon atoms, hydrogen atom or a halogen atom.

In the formula, the glycidyl group can substitute at any position to the X group on the ring. Usually, the glycidyl group substitutes at the para- and/or ortho-position to the X group, and the epoxy resins can be used as a mixture of these isomers. Among them, para-substituted epoxy resin is preferably used.

Specific examples of the epoxy resins represented by the above general formula (1) include glycidyl ethers such as 2,2'-dihydroxy-3,3',5,5'-tetramethylstilbene, 4,4'-dihydroxy-3,3',5,5'-tetramethylstilbene, 4,4'-dihydroxy-3,3'-di-t-butyl-5,5'-dimethylstilbene, 4,4'-dihydroxy-3,3'-di-t-butyl-6,6'-dimethylstilbene, 2,2'-dihydroxy-3,3'-di-t-butyl-6,6'-dimethylstilbene, 2,4'-dihydroxy-3,3'-di-t-butyl-6,6'-dimethylstilbene, 3-t-butyl-4,4'-dihydroxy-3',5,5'-trimethylstilbene, 3-t-butyl-2,4'-dihydroxy-3,5',6-trimethylstilbene, 3-t-butyl-4,4'-dihydroxy-3',5',6-trimethylstilbene, bisphenol2,2',4,4'-tetramethylbisphenol, etc.

Examples of those having a bisphenol skeleton and low molecular weight include those represented by the following general formula (2),

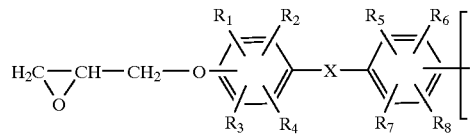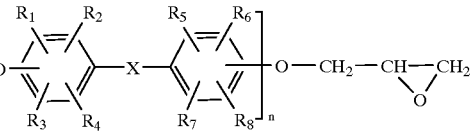

wherein X represents a group selected from

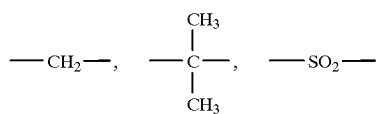

; $R_1$ to $R_6$ independently represent an acyclic or cyclic alkyl group having 1 to 6 carbon atoms, a hydrogen atom or a halogen atom; and n represents a value of 0.05 or less. These epoxy resins may be used in combination thereof.

The melting point of these epoxy resins is preferably from 80 to 150° C. in view of the handling properties.

The epoxy resin as the component (B) used in the present invention may be any amorphous one, and is not particularly limited, preferably those which are solid at room temperature and have a softening point of not higher than 100° C. Among them, a novolak epoxy resin is preferred in view of the heat resistance and low water absorption.

As the novolak epoxy resin, known resins can be used, and examples thereof include polyphenol and polynaphthol novolak resins as a reaction product of phenols (e.g. phenol, o-cresol, catechol, etc.) or naphthols (e.g. hydroxynaphthalene, dihydroxynaphthalene, etc.) and aldehydes (e.g. formaldehyde, etc.); polyaralkylphenol resins as a reaction product of phenols (e.g. phenol, o-cresol, catechol, etc.) or naphthols (e.g. hydroxynaphthalene, dihydroxynaphthalene, etc.) and xylylenedichloride or bis(hydroxymethyl)benzenes; and glycidyl ether compounds derived from polyaralkylnaphthol resins, etc. These epoxy resins may be used alone or in combination thereof.

To the epoxy resin composition of the present invention, known epoxy resin curing agents, curing accelerators, fillers (e.g. silica, alumina, titanium white, aluminum hydroxide, talc, clay, glass fiber, etc.,), natural wax, synthetic wax, higher fatty acid and a metallic salt thereof, releasants (e.g. paraffin, etc.), colorants (e.g. carbon black, etc.) and surface treating agents (e.g. such as silane coupling agent, etc.) may be added.

The epoxy resin composition of the present invention is used as adhesives, paints, insulating materials and electrical/electronic materials (e.g. laminated plate, etc.), particularly encapsulant for electronic parts.

EXAMPLES

The following examples further illustrate the present invention in detail but are not to be construed to limit the scope thereof.

Moreover, softening point was measured by the ring and ball method according to JIS K 7234.

Synthesis Example 1

An amount of 195.5 g (0.16 mol) 2,6-xylenol (hereinafter referred to "26XY"), 65.7 g (0.4 mol) of 2-t-butyl-5-methylphenol and 174.4 g (1.0 mol) of an aqueous 45% chloroacetoaldehyde solution were charged in a flask and stilbene bisphenol (yellow crystal 208 g) was obtained according to the method described in R. H. Siebe, Liebigs, Ann. Chem., 730, 31 (1969).

Then, this stilbene bisphenol was epoxidized according to the method described in Japanese Patent Kokoku Publication No. Hei 7-91360 to obtain a desired product.

The melting point of this product was 110–130° C., the epoxy equivalent was 208 g/eq. and the content of hydrolyzable chlorine was 170 ppm. Furthermore, the melt viscosity was 0.1 poise at 150° C.

Example 1

Preparation of Resin Composition

The crystalline epoxy resin obtained in Synthesis Example 1 and cresol novolak epoxy resin (trade name:

Sumiepoxy ESCN-195XL3, manufactured by Sumitomo Chemical Co., Ltd.) as the amorphous epoxy resin were mixed at the composition shown in Table 1, and the mixture was molten and mixed in a beaker at 150° C. to obtain an uniform resin composition. After cooling to room temperature, the composition was stirred over a hot plate heated to 80° C. to obtain an opaque resin composition wherein the crystalline epoxy resin is uniformly dispersed in the amorphous epoxy resin.

The softening point of this resin composition was measured as shown in Table 1.

Comparative Example 1

The softening point of a cresol novolak epoxy resin (trade name: Sumiepoxy ESCN-195XL3, manufactured by Sumitomo Chemical Co., Ltd.) was measured as shown in Table 1.

Comparative Example 2

The softening point of a low-molecular weight cresol novolak epoxy resin (trade name: Sumiepoxy ESCN-195LL, manufactured by Sumitomo Chemical Co., Ltd.) was measured as shown in Table 1.

Comparative Example 3

A bisphenol epoxy resin (trade name: Sumiepoxy ELA-128, manufactured by Sumitomo Chemical Industries Co., Ltd.) as the amorphous epoxy resin and a cresol novolak epoxy resin (trade name: Sumiepoxy ESCN-195XL3, manufactured by Sumitomo Chemical Co., Ltd.) as the amorphous epoxy resin were mixed at the composition shown in Table 1, and the mixture was molten and mixed in a beaker at 150° C. to obtain an uniform resin composition. The melting point of this resin composition was measured as shown in Table 1.

Comparative Example 4

The resin composition mixed in the same composition as in Example 1 was molten and mixed in a beaker at 150° C. and then cooled to room temperature to obtain an uniform resin composition. This resin was stirred over a hot plate heated to 130° C., but an opaque resin composition wherein the crystalline epoxy resin was uniformly dispersed in the amorphous epoxy resin was not obtained.

TABLE 1

| | Example | | | Comparative example | | |
|---|---|---|---|---|---|---|
| | 1 | 2 | 3 | 1 | 2 | 3 |
| Composition | | | | | | |
| Resin obtained by Synthesis Example 1 | 40 | 50 | 60 | — | — | — |
| ESCN-195XL3 | 60 | 50 | 40 | 100 | — | 50 |
| ESCN-195LL | — | — | — | — | 100 | — |
| ELA-128 | — | — | — | — | — | 50 |
| Softening point (°C.) | >100 | >100 | >100 | 68 | 55 | 28 |

The epoxy resin composition of the present invention have a high softening point and an excellent handling property.

What is claimed is:

1. A method for producing an epoxy resin composition comprising a crystalline epoxy resin (A) and an amorphous epoxy resin (B) which comprises mixing a crystalline epoxy resin (A) with an amorphous epoxy resin (B) with heating at a temperature not higher than a melting point of the former and not lower than a softening point of the latter.

2. A method for producing the an epoxy resin composition which comprises:

mixing a crystalline epoxy resin (A) with an amorphous epoxy resin (B) with heating at a temperature not lower than a melting point of the former and not lower than that of the latter, cooling the resulting mixture to a temperature not higher than the melting point of the former to deposit a crystal of the former, and then kneading the mixture at a temperature of not lower than the softening point of the amorphous epoxy resin and not higher than the melting point of the crystalline epoxy resin.

* * * * *